United States Patent
Hert et al.

(10) Patent No.: US 9,624,331 B2
(45) Date of Patent: Apr. 18, 2017

(54) MIXTURE OF COPOLYMERS GRAFTED WITH POLYAMIDE BLOCKS AND ELASTOMERS FORMULATED WITH A CROSS-LINKING OR VULCANISATION SYSTEM

(75) Inventors: Marius Hert, Epfig (FR); Dominique Jousset, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 1940 days.

(21) Appl. No.: 12/667,259

(22) PCT Filed: Jul. 1, 2008

(86) PCT No.: PCT/FR2008/051212
§ 371 (c)(1),
(2), (4) Date: Jun. 8, 2010

(87) PCT Pub. No.: WO2009/007633
PCT Pub. Date: Jan. 15, 2009

(65) Prior Publication Data
US 2010/0256276 A1 Oct. 7, 2010

(30) Foreign Application Priority Data
Jul. 2, 2007 (FR) ........................ 07 56230

(51) Int. Cl.
*C08F 255/02* (2006.01)
*C08F 255/00* (2006.01)
*C08L 51/06* (2006.01)

(52) U.S. Cl.
CPC .......... *C08F 255/02* (2013.01); *C08F 255/00* (2013.01); *C08L 51/06* (2013.01)

(58) Field of Classification Search
USPC .................................. 524/432; 525/534, 535
See application file for complete search history.

(56) References Cited

U.S. PATENT DOCUMENTS

| | | | |
|---|---|---|---|
| 3,976,720 A | 8/1976 | Hammer et al. | |
| 4,762,877 A * | 8/1988 | Heilbrunn | 524/432 |
| 5,160,475 A | 11/1992 | Asano et al. | |
| 2003/0199635 A1 | 10/2003 | Court et al. | |
| 2004/0024127 A1 | 2/2004 | Baumert et al. | |
| 2005/0112312 A1 | 5/2005 | Baumert et al. | |

FOREIGN PATENT DOCUMENTS

| | | |
|---|---|---|
| JP | H03-227348 A | 10/1991 |
| JP | 2001-525477 A | 12/2001 |
| WO | 99/29777 A1 | 6/1999 |
| WO | WO 2006/056690 | 6/2006 |

OTHER PUBLICATIONS

Office Action issued on Dec. 7, 2012, by the Japanese Patent Office in corresponding Japanese Patent Application No. 2010-514073, and an English Translation of the Office Action. (9 pages).

* cited by examiner

*Primary Examiner* — Mark Eashoo
*Assistant Examiner* — Chelsea M Christensen
(74) *Attorney, Agent, or Firm* — Buchanan Ingersoll & Rooney P.C.

(57) ABSTRACT

The mixture of the invention contains, for 100 parts by weight: (A) 10 to 90 parts in weight of at least one copolymer grafted to polyamide blocks, said copolymer comprising a polyolefin trunk and at least 1.3 polyamide grafts on said trunk in average, and having a nanostructured organization, wherein said grafts are attached to the trunk by the rest of an unsaturated monomer (X) having a function capable of reacting with a polyamide with an amine end; the rest of said monomer (X) being attached on the trunk by grafting or copolymerization from its double bond thereof, (A) optionally including at least one non-grafted polyolefin in a proportion such that the nano-structured organization of the compound (A) is preserved; and (B) 90 to 10 parts in weight of a formulation of at least one elastomer having unsaturated double bonds and capable of reacting with a crosslinking or vulcanization agent, said formulation containing a crosslinking or vulcanization system of said elastomer(s), at least one plasticizer and the standard additives present in elastomer formulations.

21 Claims, No Drawings

MIXTURE OF COPOLYMERS GRAFTED WITH POLYAMIDE BLOCKS AND ELASTOMERS FORMULATED WITH A CROSS-LINKING OR VULCANISATION SYSTEM

The present invention relates to mixtures of copolymers grafted with polyamide blocks and unsaturated elastomers, which have been formulated with a crosslinking or vulcanizing system and, conventionally, with plasticizers, fillers, and other customary additives.

The invention also concerns a process for preparing corresponding thermoplastic elastomer compositions by dynamic vulcanizing or crosslinking of a formulated elastomer of this kind in a graft copolymer of this kind having polyamide blocks.

The invention concerns the resultant thermoplastic elastomer compositions, their uses for the manufacture of finished articles, especially by the technologies of extrusion, injection molding and compression molding, and also the finished products thus obtained.

The best-known thermoplastic elastomers having rubbery properties are products of a process of dynamic vulcanization of a formulated elastomer—such as a formulated ethylene-propylene-diene (EPDM) elastomer—in a matrix which is generally of polyolefin type—polypropylene (PP) in particular or else polyethylene (PE).

In such a process, the thermoplastic, such as the PP or PE, is mixed with an elastomer, such as EPDM, which is formulated with a vulcanizing system, and this elastomer is crosslinked during the mixing phase.

The products obtained are referred to as thermoplastic vulcanisates (TPVs) and are composed of a thermoplastic matrix which covers rubber particles of a few microns in size, it being possible for the rubber phase to be the majority phase (up to 85% by weight). These products may be employed, like thermoplastics, by extrusion or injection molding, while having the properties of the rubbery phase, namely a low compression or tension set.

However, these alloys possess the thermodynamic limitations which are inherent in the thermoplastic polymers used as a matrix, and, for thermoplastic vulcanisates (TPVs) with a PP matrix and EPDM elastomer, the service temperature limit imposed by the PP is 130° C. Moreover, the flexural modulus and the high hardness of PP lead to alloys having a fairly high hardness.

International PCT application WO 02/28959 A1 describes graft copolymers having polyamide blocks and their mixtures with flexible polyolefins having a flexural elastic modulus of less than 150 MPa. These low-modulus, flexible mixtures do not have a rubbery elasticity at 70° C. or more, because the polyolefin of the mixture is semicrystalline, with a melting point of between 60° C. and 100° C.

It has been found that these copolymers having polyamide blocks become organized into structures on the nanometric scale, which gives them exceptional thermomechanical strength properties. This thermomechanical behavior is manifested in a virtually constant elastic modulus within a temperature range from 100° C. to 180° C.

Graft polyolefins having polyamide blocks, which are obtained especially from the technology of grafting of monoamine polyamides onto the maleic anhydride of an ethylene/butyl acrylate/maleic anhydride terpolymer, are flexible thermoplastics having a high thermomechanical strength. They exhibit a relatively high flexural elastic modulus, being especially less than 200 MPa and greater than 50 MPa, and a dynamic elastic modulus, measured at 150° C., of between 0.5 MPa and 10 MPa. This modulus is relatively constant within a wide temperature range from 100 to 180° C., in other words between the melting point of the ethylene/butyl acrylate/maleic anhydride terpolymer (80-100° C.) and that of the polyamide (180-220° C.) in the example cited.

These copolymers having polyamide blocks, however, are not elastomers, since they exhibit a low remanent elasticity on compression at beyond 80° C. It may be said that they do not possess rubber-elasticity expressed as a percentage of compression set (CS). A thermoplastic elastomer has a CS of typically less than 50%, or even 30%, whereas the grafted polyolefins having polyamide blocks have a CS of typically between 60% and 80%.

U.S. Pat. No. 4,130,535 describes alloys based on 25% to 75% of thermoplastic polymers and 75% to 25% of olefinic rubbers which are formulated with plasticizers and completely crosslinked. The thermoplastic polymer is polypropylene.

Patent EP 384 822 describes compositions based on copolymers of ethylene and alpha-olefins and on rubbers based on plasticized and crosslinked polynorbornene, having a Shore A hardness of not more than 65 by virtue of the plasticization capacity of the polynorbornene and of the selection of the thermoplastic polymer from ethylene copolymers with a melting point not exceeding 130° C. These alloys have compression sets, measured at 70° C., of less than 45%.

European patent application EP 1672027 describes a thermoplastic polymer composition obtained by mixing a rubber in which a gel fraction of 30% by weight or more is dispersed uniformly in a polymer based on polyamide and/or based on polyester, and by dynamic crosslinking of the rubber. Thermoplastic polymers of this kind based on polyamide or polyester have the disadvantages of not exhibiting effective hydrolysis resistance or salt resistance and not exhibiting low Shore A hardnesses.

The aim of the present invention is to provide a TPV alloy which exhibits enhanced properties relative to those of the known systems, but without sacrificing the good properties of such systems. Thus, relative to the known systems based on polypropylene, the aim in particular is for improved temperature behavior, in light of the fact that polypropylene loses its properties at around 130-140° C.; the possibility of attaining lower hardnesses; and the possibility of adhering to other materials, especially polyamide. Relative to the known systems based on polyamide, the aim in particular is for improved hydrolysis resistance and resistance to salts, such as zinc chloride, and the possibility of attaining lower hardnesses.

These objectives are achieved in accordance with the invention by virtue of the use of a flexible thermoplastic base with a high thermal resistance, which loses its properties only at around 170-180° C. and which forms a continuous phase further comprising free functional groups, such as free maleic anhydride groups, thereby promoting the adhesion of the resulting TPV to materials such as polyamide or metals. The TPVs of the present invention are useful for producing articles having good elastic properties within a wide temperature range from −40° C. to 160° C.

The production of TPV alloys with a copolymer matrix grafted with polyamide blocks, in accordance with the present invention, allows elastic objects to be produced which are flexible, of low hardness, and with service temperatures which are higher than those of the TPVs having a polyolefin matrix.

The present invention accordingly first provides a mixture comprising, per 100 parts by weight:
(A) 10 to 90 parts by weight of at least one graft copolymer having polyamide blocks, said copolymer being composed of a polyolefin backbone and of on average at least 1.3 polyamide grafts on said backbone, and having a nanostructured organization, where
   said grafts are attached to the backbone by the residues of an unsaturated monomer (X) having a function capable of reacting with an amino-terminal polyamide; and
   the residues of said unsaturated monomer (X) being attached to the backbone by grafting or copolymerization from its double bond,
   it also being possible for said constituent (A) to comprise at least one ungrafted, polyolefin in a proportion such that the nanostructured organization of said component (A) is not lost; and
(B) 90 to 10 parts by weight of a formulation of at least one elastomer which has unsaturated double bonds and is capable of reacting with a crosslinking or vulcanizing agent, said formulation including a system for crosslinking or vulcanizing of said elastomer or elastomers, at least one plasticizer, and the additives customary in elastomer formulations.

The proportion of the constituent (A) is especially from 15 to 75 parts by weight for, respectively, 85 to 25 parts by weight of the constituent (B).

The proportion of the constituent (A) may be advantageously from 20 to 50 parts by weight for, respectively, from 80 to 50 parts by weight of the constituent (B).

Constituent A

The constituent (A) consists of at least one graft copolymer having polyamide blocks, as described in international PCT application WO 02/28959, which may be obtained by reacting an amino-terminal polyamide with the residues of an unsaturated monomer X which is attached by grafting or copolymerization to a polyolefin backbone. A graft copolymer of this kind is a flexible thermoplastic which has a high thermomechanical strength.

The monomer X may be, for example, an unsaturated epoxide or an unsaturated carboxylic acid anhydride.

Examples of unsaturated epoxides are, for example:
   aliphatic glycidyl esters and ethers, such as allyl glycidyl ether, vinyl glycidyl ether, glycidyl maleate and glycidyl itaconate, glycidyl acrylate and glycidyl methacrylate; and
   alicyclic glycidyl esters and ethers, such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate, and endocis-bicyclo[2.2.1]-5-heptene-2,3-diglycidyl dicarboxylate.

Examples of unsaturated carboxylic anhydrides are, especially, maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic, and methylbicyclo[2.2.1]hept-5-ene-2,2-dicarboxylic anhydrides. It is advantageous to use maleic anhydride. Without departing from the scope of the invention, some or all of the anhydride may be replaced by an unsaturated carboxylic acid, such as, for example, (meth)acrylic acid.

As regards the polyolefin backbone, a polyolefin is defined as a homopolymer or copolymer of alpha-olefins or diolefins, such as, for example, ethylene, propylene, but-1-ene, oct-1-ene or butadiene. By way of example, mention may be made of:
   homopolymers and copolymers of ethylene, in particular low-density polyethylene (LOPE), high-density polyethylene (HDPE), linear low-density polyethylene (LLDPE), very low-density polyethylene (VLDPE), and polyethylenes obtained by metallocene catalysis, as described for example in the aforementioned international PCT application; copolymers of ethylene with at least one alpha-olefin, for example a $C_3$-$C_8$ alpha-olefin, such as ethylene/propylene copolymers, ethylene-propylene elastomers (EPR) and ethylene/propylene/diene elastomers (EPDM); copolymers of ethylene with at least one product selected from the salts or esters of unsaturated carboxylic acids, such as the esters of (meth)acrylic acid with $C_1$-$C_8$ alcohols, for example methyl acrylate, or the vinyl esters of saturated carboxylic acids, such as vinyl acetate, it being possible for the proportion of comonomer to be as much as 40% by weight;
   homopolymers and copolymers of propylene;
   block styrene/ethylene-butene/styrene (SEBS), styrene/butadiene/styrene (SBS), styrene/isoprene-/styrene (SIS), and styrene/ethylene-propylene/styrene (SEPS) copolymers.

Advantageously, the polyolefin backbones to which the residues of X are attached are polyethylenes grafted with X or are copolymers of ethylene and X that are obtained, for example, by free-radical polymerization.

As regards the polyethylenes onto which X will be grafted, polyethylene is understood to mean homopolymers or copolymers.

As comonomers forming part of the constitution of these copolymers, mention may be made of the following:
   alpha-olefins, advantageously those having 3 to 30 carbon atoms, examples of such alpha-olefins being propylene, 1-butene, 1-pentene, 3-methyl-1-butene, 1-hexene, 4-methyl-1-pentene, 3-methyl-1-pentene, 1-octene, 1-decease, 1-dodecene, 1-tetradecene, 1-hexadecene, 1-octadecene, 1-eicosene, 1-docosene, 1-tetracosene, 1-hexacosene, 1-octacosene, and 1-triacontene, it being possible for these alpha-olefins to be used alone or as a mixture of two or more than 2;
   esters of unsaturated carboxylic acids, such as, for example, alkyl (meth)acrylates, it being possible for the alkyls to have up to 24 carbon atoms, examples of alkyl acrylate or methacrylate being, especially, methyl methacrylate, ethyl acrylate, n-butyl acrylate, isobutyl acrylate, and 2-ethylhexyl acrylate;
   vinyl esters of saturated carboxylic acids, such as, for example, vinyl acetate or vinyl propionate;
   dienes such as, for example, 1,4-hexadiene.

The polyethylene may comprise two or more of the aforementioned comonomers.

Advantageously, the polymer, which may be a mixture of two or more polymers, comprises at least 50% and preferably more than 75% (on a molar basis) of ethylene; its density may be between 0.86 and 0.98 g/cm³. The MFI (index of viscosity at 190° C., 2.16 kg) is advantageously between 5 and 100 g/10 min.

As examples of polyethylenes, mention may be made of:
low-density polyethylene (LDPE);
high-density polyethylene (HDPE);
linear low-density polyethylene (LLDPE);
very low-density polyethylene (VLDPE);
polyethylene obtained by metallocene catalysis;
EPR (ethylene-propylene-rubber) elastomers;
EPDM (ethylene-propylene-diene) elastomers;
mixtures of polyethylene with an EPR or an EPDM; and ethylene-alkyl(meth)acrylate copolymers which may contain up to 60% and preferably 2% to 40% by weight of (meth)acrylate.

Grafting is an operation which is known per se.

As regards copolymers of ethylene and X, i.e., those in which X is not grafted, these are copolymers of ethylene, of X, and, optionally, of another monomer which may be selected from the comonomers cited above for the ethylene copolymers intended to be grafted.

It is advantageous to use ethylene-maleic anhydride and ethylene-alkyl (meth)acrylate-maleic anhydride copolymers. These copolymers comprise advantageously from 0.2% to 10% by weight of maleic anhydride, and from 0% to 40% and, preferably, 5% to 40% by weight of alkyl (meth)acrylate. Their MFI is between 5 and 100 (190° C.-2.16 kg). The alkyl (meth)acrylates have already been described above. The melting point is between 60 and 100° C.

Advantageously there are on average at least 1.3 moles of X per chain that are attached to the polyolefin backbone and, preferably, from 1.3 to 10, and more preferably 1.3 to 7. The person skilled in the art is able easily to determine the number of these moles of X by FTIR analysis.

As regards the amino-terminal polyamide, a polyamide is understood to comprise the condensation products of:
one or more amino acids, such as aminocaproic, 7-aminoheptanoic, 11-aminoundecanoic, and 12-amino-dodecanoic acids;
one or more lactams, such as caprolactam, oenantholactam, and lauryllactam;
one or more salts or mixtures of diamines, such as hexamethylenediamine, dodecamethylenediamine, metaxylylenediamine, bis-p-aminocyclohexylmethane, and trimethylhexamethylenediamine, with diacids, such as isophthalic, terephthalic, adipic, azelaic, suberic, sebacic, and dodecanedicarboxylic acids;
or mixtures of two or more monomers, leading to copolyamides.

It is possible to use mixtures of polyamides or copolyamides. Use is made advantageously of PA 6, PA 11, PA 12, the copolyamide having 6 units and 11 units (PA 6/11), the copolyamide having 6 units and 12 units (PA 6/12), and the copolyamide based on caprolactam, hexamethylenediamine, and adipic acid (PA 6/6-6). The advantage of copolyamides is that it is thus possible to select the melting point of the grafts.

Advantageously the grafts are homopolymers composed of residues of caprolactam, of 11-aminoundecanoic acid or of dodecalactam, or are copolyamides composed of residues selected from at least two of the three aforementioned monomers.

The degree of polymerization may vary within large proportions; depending on its value, the product is a polyamide or a polyamide oligomer. In the remainder of the text, either of the two expressions will be used for the grafts.

For the polyamide to have a monoamine termination, it is sufficient to use a chain stopper of formula:

in which:
R$_1$ is hydrogen or a linear or branched alkyl group containing up to 22 carbon atoms;

R$_2$ is a linear or branched alkyl or alkenyl group having up to 22 carbon atoms, a saturated or unsaturated cycloaliphatic radical, an aromatic radical or a combination of the aforementioned.

The stopper may be, for example, laurylamine, stearylamine or oleylamine.

Advantageously, the grafts (amino-terminal polyamide) have a weight-average molar mass of less than 5000 g/mol, said mass being, for example, between 1000 and 5000 g/mol and preferably between 2000 and 4000 g/mol.

Very preferably, the grafts (amino-terminal polyamide) have a number-average molar mass of less than or equal to 5000 g/mol, said mass being, for example, from 1000 to 5000 g/mol and preferably from 2000 to 4000 g/mol.

The amino acid or lactam monomers which are preferred for the synthesis of the monoamine oligomer according to the invention are selected from caprolactam, 11-aminoundecanoic acid or dodecalactam. The monofunctional polymerization stoppers that are preferred are laurylamine, stearylamine, and oleylamine. The polycondensation defined above takes place in accordance with the processes which are commonly known: for example, at a temperature of in general between 200 and 300° 0, under vacuum or in an inert atmosphere, with stirring of the reaction mixture. The average chain length of the oligomer is determined by the initial molar ratio between the polycondensable monomer or the lactam and the monofunctional polymerization stopper. For the calculation of the average chain length, it is customary to count one molecule of chain stopper to one chain of oligomer.

The addition of the monoamine polyamide oligomer to the polyolefin backbone comprising X takes place by reaction of an amine function of the oligomer with X. Advantageously, X carries an anhydride or acid function, and in this way amide or imide bonds are produced.

The addition of the amine-terminal oligomer to the polyolefin backbone comprising X takes place preferably in the melt state. In this way, in an extruder, it is possible to mill the oligomer and the backbone at a temperature generally of between 230 and 250° C. The average residence time of the melted material in the extruder may be between 1 and 3 minutes. The yield of this addition is evaluated by selective extraction of the free polyamide oligomers, in other words those which have not reacted to form the final graft copolymer having polyamide blocks.

The preparation of amino-terminal polyamides of this kind and their addition to a polyolefin backbone comprising X are described in patents U.S. Pat. No. 3,976,720, U.S. Pat. No. 3,963,799, U.S. Pat. No. 5,342,886, and FR 2291225.

The graft copolymers having polyamide blocks of the present invention are characterized by a nanostructured organization. In these copolymers, a nanostructured organization is defined by polyamide sheets having a thickness of between 10 and 50 nanometers, or else by an elastic modulus, measured by thermomechanical analysis at a frequency of 1 Hz on a Rheometrics dynamic rheometer, of more than 0.5 MPa at the center of the range between the melting point of the polyolefin backbone and the melting point of the polyamide graft, when the melting point of the polyolefin backbone is less by at least 40° C. than that of the polyamide graft.

The thickness of the polyamide sheets may be measured advantageously by the person skilled in the art using the known technique of Transmission Electron Microscopy and standard image processing software.

Mention may also be made of the fact that only part of the thermoplastic matrix phase (constituent (A)) may be composed of an ungrafted polyolefin, selected from the polyolefins indicated above.

Mention may be made of the following ungrafted polyolefins:

homopolymers and copolymers of ethylene, in particular low-density polyethylene (LDPE), high-density polyethylene (HDPE), linear low-density polyethylene (LLDPE), very low-density polyethylene (VLDPE), and polyethylenes obtained by metallocene catalysis, as described for example in the aforementioned international PCT application; copolymers of ethylene with at least one alpha-olefin, for example a $C_3$-$C_8$ alpha-olefin, such as ethylene/propylene copolymers, ethylene-propylene elastomers (EPR) and ethylene/propylene/diene elastomers (EPDM); copolymers of ethylene with at least one product selected from the salts or esters of unsaturated carboxylic acids, such as the esters of (meth)acrylic acid with $C_1$-$C_8$ alcohols, for example methyl acrylate, or the vinyl esters of saturated carboxylic acids, such as vinyl acetate, it being possible for the proportion of comonomer to be as much as 40% by weight;

homopolymers and copolymers of propylene;

block styrene/ethylene-butene/styrene (SEBS), styrene/butadiene/styrene (SBS), styrene/isoprene-/styrene (SIS), and styrene/ethylene-propylene/styrene (SEPS) copolymers;

olefin polymers, such as polymers of ethylene and of propylene, copolymerized or functionalized with reactive monomers, more particularly—but without limitation—with maleic anhydride.

The graft copolymer having polyamide blocks may advantageously represent more than 50% by weight of the constituent (A), so that this mixture of thermoplastics retains a nanostructured organization with polyamide sheets having a thickness of between 10 and 50 nanometers.

The polyolefin of the backbone of the graft copolymer of the constituent (A), or forming part of the composition of the constituent (A), may thus be selected from ethylene homopolymers, propylene homopolymers, copolymers of ethylene with $C_3$-$C_8$ alpha-olefins, with esters of (meth) acrylic acid and $C_1$-$C_8$ alcohols, and with vinyl acetate.

In accordance with one particular embodiment, the graft copolymer having polyamide blocks may be present in the form of its precursors formed from the mixture of polyolefin backbone amino-terminal polyamide grafts.

In this case, the graft copolymer (A) is prepared in situ by mixing the polyolefin backbone and the amino-terminal grafts, the final mixture necessarily giving a TPV with a nanostructured matrix.

Constituent (B)

Constituent (B) is composed of 100 parts by weight of a crosslinkable elastomer and a certain number of additives, whose amount is expressed in parts per 100 parts of elastomer (phr). These additives are incorporated into the elastomer at a temperature which is sufficiently low to not crosslink the elastomer, typically less than 100° C., in mixers which are well known in the rubber industry, such as Banbury mixers and roll mixers.

The unsaturated elastomer is especially selected from:

terpolymers of ethylene, propylene, and a diene (EPDM);

elastomers based on butadiene, natural (NR) or synthetic, and styrene-butadiene copolymers (SBR);

copolymers of butadiene with acrylonitrile (NBR);

partially hydrogenated copolymers of butadiene with acrylonitrile (HNBR);

elastomers based on isoprene (IR);

acrylic elastomers such as the copolymers of acrylic esters having a reactive acid or epoxy fraction, such as copolymers of methyl acrylate or butyl acrylate with acrylic acid or glycidyl methacrylate (ACR).

The crosslinking or vulcanizing system is adapted to the type of elastomer used. It is especially selected from vulcanizing agents based on sulfur, peroxide, phenolic resin or on azo, maleimido, quinoid, and urethane compounds, for the diene elastomers; from agents based on polyfunctional amines, such as hexamethylenediamine carbamate, or on diisocyanates, for the acrylic elastomers having acid groups; or from agents based on ammonium salts, 2-methylimidazole or the molecules of polyfunctional acids, for the acrylic elastomers having an epoxide group.

The proportions of the crosslinking or vulcanizing system are the customary proportions which are known to the person skilled in the art for obtaining virtually complete crosslinking or vulcanizing of the elastomer phase.

The crosslinking or vulcanizing system represents, in particular, from 1 to 20 phr of the constituent (B).

The plasticizer or plasticizers represent typically from 5 to 200 phr of the constituent (B) and are selected especially from oils composed of mixtures of aliphatic, naphthenic or aromatic hydrocarbons, for the diene elastomers having unsaturated double bonds, and from polar oils based on esters of phthalic acid, for the acrylic elastomers.

The customary additives are generally selected from pulverulent inorganic fillers, such as zinc oxides and titanium oxides, carbon blacks, kaolins, and silicas, pigments, coupling agents, antidegradants, processing additives such as stearates, and waxes, and represent especially 10 to 150 phr of the constituent (B).

The present invention further provides a crosslinked or vulcanized thermoplastic composition characterized in that it is formed of the mixture as defined above, wherein the elastomer of the constituent (B) has been crosslinked or vulcanized in the course of mixing with the constituent (A).

The present invention further provides a process for preparing the composition as defined above, characterized in that the formulation of the constituent (B) with the constituent (A) is milled at a sufficient temperature and for a sufficient period of time to crosslink or vulcanize the elastomer of the constituent (B). A process of this kind is referred to as a "dynamic vulcanizing or crosslinking process". The milling may be carried out in a conventional apparatus such as, for example, a Banbury mill, a Brabender mill, a Rheocord mill or an extruder, at a temperature between 150° C. and 240° C. approximately, for a time of between 3 and 15 minutes approximately, this time decreasing in inverse proportion to the temperature.

The present invention provides, lastly, a finished article at least one of whose constituents is obtained from the composition as defined above, or obtained by the process as defined above, by the customary techniques for processing plastics, such as—without limitation—by extrusion or coextrusion, extrusion coating, injection molding, compression molding, calendering, deposition on cable, deposition of powders after grinding, including by the processes of electrostatic spraying, fluidized bed dipping, laser prototyping, rotor molding or slush molding, said latter process being known to the person skilled in the art and denoting a process of molding by free flow of powder in a hot mold, especially for producing "skins" for dashboards, door panels or consoles.

Such an article may therefore be a single-material or multimaterial article, and may be composed, for example, of an adhesive or an adhesion binder, a coating, a film, a plate or a flexible tube, in single-layer or multilayer form, a seal for the construction and automotive industries, a protective bellows for the automotive industry, or a single-material or multimaterial injection-molded article.

The composition according to the invention may especially but not exclusively be combined, in the aforementioned articles, in accordance with the invention, with other polymeric materials such as polyamides or polyolefins, or else with metals or glass.

The articles may be used in various applications, examples of which are given hereinbelow without, however, limiting the scope of the invention: fuel or cooling fluid transport lines, electrical cables, cable transport sheaths, adhesives, thermal protection layers or coatings, seals for the construction and automotive industries, and protective bellows for the automotive industry.

The examples below illustrate the present invention, though without limiting its scope. In these examples, the parts and percentages are by weight, unless otherwise indicated.

EXAMPLE 1

Comparative

The reference is a thermoplastic elastomer composed of 35% of a polypropylene with an MFI of 2 g/10 min (at 230° under 2.16 kg) (A1) and of 65% of a formulated EPDM (B1), crosslinked with a system based on phenolic resin and comprising 150 phr of aliphatic oil.
Composition of (B1)

| | |
|---|---|
| EPDM | 100 phr |
| Polyphenolic crosslinking agent with a degree of polymerization of between 4 and 5 | 12 phr |
| Zinc oxide accelerator | 12 phr |
| Aliphatic plasticizer | 150 phr |
| Kaolin | 40 phr |
| Titanium oxide pigment | 10 phr |

This thermoplastic elastomer has a Shore A hardness of 65 and a compression set, measured at 80° C., of 35%.

Its creep resistance at 150° C. on an injection-molded bar subjected to a stress of $4.9 \times 10^4$ Pa (0.5 kg/cm$^2$) can no longer be measured, since the test specimens rapidly break.

Its elastic modulus at 150° C., measured with a Rheometrics dynamic rheometer at a frequency of 1 Hz, is less than 0.1 MPa.

EXAMPLE 2

On a Brabender mixer rotating at 80 rpm, in 8 minutes with a regulated temperature of 180° C., we produced an alloy composed of 35% by weight of a graft copolymer having polyamide blocks (A2) and of 65% by weight of a formulated EPDM elastomer (B1) of Comparative Example 1, comprising a crosslinking system based on phenolic resin and 150 phr of aliphatic oil.

The thermoplastic elastomer obtained has a Shore A hardness of 55 and a compression set at 80° C. of 38%.

Its creep resistance at 150° C. on an injection molded bar subjected to a stress of $4.9 \times 10^4$ Pa (0.5 kg/cm$^2$) is 25% after 15 minutes.

The elastic modulus of this composition, measured with a Rheometrics dynamic rheometer at a frequency of 1 Hz, is greater than 1 MPa.
Composition of (A2): Graft Polymer Having PA Blocks The copolymer having PA blocks (A2) was produced by the process described in WO 02/28959, and is composed of 80% of an ethylene/ethyl acrylate/maleic anhydride terpolymer, in an amount by weight of 80/17/3, and of 20% of polyamide 6 grafts having a weight-average molar mass of 3000 g/mol.

EXAMPLE 3

Comparative

On a Buss co-kneader with a diameter of 40 mm, equipped with a pelletizing extruder having a thermal profile of between 160° C. and 250° C., we produced an alloy composed of 60% by weight of a high-viscosity polyamide 6 for extrusion (A3) and of 40% by weight of a formulated acrylic elastomer (B3).

B3 is composed of a copolymer with butyl acrylate, comprising acid functions for crosslinking, which is formulated in a Brabender mixer regulated at 80° C. with 5 phr of hexamethylenediamine carbamate.

This thermoplastic elastomer possesses a Shore D hardness of 60.

It is subsequently extruded in the form of a tube of 18/20 mm in diameter.

This tube is subsequently subjected to a test which is carried out in the automotive industry to test its resistance to an aggressive medium:

It is bent at 180° as per FIAT method 9.0213701, the radius of bending being equal to approximately 5 times the outer diameter of the tube, and is partly immersed at 23° C. in a 50% by weight aqueous zinc chloride solution.

After 200 hours, it is found that the test specimens have broken, since the PA6 in the composition is not resistant to stress cracking in this medium.

EXAMPLE 4

On a Buss co-kneader with a diameter of 40 mm, equipped with a pelletizing extruder having a thermal profile of between 160° C. and 250° C., we produced an alloy composed of 60% by weight of a graft copolymer having polyamide blocks (A2) of Example 2 and of 40% by weight of a formulated acrylic elastomer (B3) of Example 3.

This thermoplastic elastomer possesses a Shore D hardness of 25.

It is subsequently extruded in the form of a tube of 18/20 mm in diameter and is subjected to the test of Example 3.

This tube does not break in this test.

The invention claimed is:
1. A mixture comprising, per 100 parts by weight:
(A) 10 to 90 parts by weight of at least one graft copolymer having polyamide blocks, said copolymer being composed of a polyolefin backbone and of on average at least 1.3 polyamide grafts on said backbone, and having a nanostructured organization, where
said grafts are attached to the backbone by the residues of an unsaturated monomer (X) having a function capable of reacting with an amino-terminal polyamide; and
the residues of said unsaturated monomer (X) being attached to the backbone by grafting or copolymerization from its double bond, optionally said constituent (A) comprises at least one ungrafted polyolefin in a proportion such that the nanostructured organization of said component (A) is not lost; and (B) 90 to 10 parts by weight of a formulation of at least one elastomer which has unsaturated double bonds and is capable of reacting with a crosslinking or vulcanizing agent, said formulation including a system for crosslinking or vulcanizing of said elastomer or elastomers, at least one plasticizer, and other additives.

2. The mixture as claimed in claim 1, wherein the proportion of constituent (A) is from 15 to 75 parts by weight for, respectively, 85 to 25 parts by weight of the constituent (B).

3. The mixture as claimed in claim 1, wherein X is an unsaturated carboxylic acid anhydride.

4. The mixture as claimed in claim 3, wherein the polyolefin backbone comprising X is selected from ethylene-maleic anhydride and ethylene-alkyl (meth)acrylate-maleic anhydride copolymers.

5. The mixture as claimed in claim 1, wherein there are on average 1.3 to 10 moles of X, attached to the polyolefin backbone of the constituent (A).

6. The mixture as claimed in claim 1, wherein the grafts are homopolymers composed of residues of caprolactam, of 11-aminoundecanoic acid or of dodecalactam or are copolyamides composed of residues selected from at least two of the three aforementioned monomers.

7. The mixture as claimed in claim 1, wherein the grafts have a weight-average molar mass of less than 5000 g/mol.

8. The mixture as claimed in claim 1, wherein the polyolefin of the backbone of the graft copolymer of the constituent (A) or forming part of the composition of the constituent (A) is selected from ethylene homopolymers, propylene homopolymers, copolymers of ethylene with $C_3$-$C_8$ alpha-olefins, copolymers of ethylene with esters of (meth)acrylic acid and copolymers of ethylene $C_1$-$C_8$ alcohols and with vinyl acetate.

9. The mixture as claimed in claim 1, wherein the copolymer having polyamide blocks exhibits a nanostructured organization with polyamide lamellae with a thickness of between 10 and 50 nanometers, or with an elastic modulus, measured by thermomechanical analysis to a frequency of 1 Hz on a Rheometrics dynamic rheometer, of more than 0.5 MPa at the center of the range between the melting point of the polyolefin backbone and the melting point of the polyamide graft, when the melting point of the polyolefin backbone is lower by at least 40° C. than that of the polyamide graft.

10. The mixture as claimed in claim 1, wherein the graft copolymer having polyamide blocks represents more than 50% by weight of the constituent (A).

11. The mixture as claimed in claim 1, wherein the unsaturated elastomer of the constituent (B) is selected from:
terpolymers of ethylene, propylene, and a diene (EPDM);
elastomers based on butadiene, natural (NR) or synthetic, and styrene-butadiene copolymers (SBR);
copolymers of butadiene with acrylonitrile (NBR);
partially hydrogenated copolymers of butadiene with acrylonitrile (HNBR);
elastomers based on isoprene (IR); and
acrylic elastomers.

12. The mixture as claimed in claim 1, wherein the crosslinking or vulcanizing system is selected from the group consisting of vulcanizing agents based on sulfur, peroxide, phenolic resin on azo maleimido, quinoid, and urethane compounds, for the diene elastomers; from agents based on polyfunctional amines, hexamethylenediamine carbamate, and on diisocyanates, for the acrylic elastomers having acid groups; and from agents based on ammonium salts, 2-methylimidazole and the molecules of polyfunctional acids, for the acrylic elastomers having an epoxide group.

13. The mixture as claimed in claim 1, wherein the crosslinking or vulcanizing system represents 1 to 20 phr of the constituent (B).

14. The mixture as claimed in any claim 1, wherein the plasticizer or plasticizers represent 5 to 200 phr of the constituent (B), being selected from oils composed of mixtures of aliphatic, naphthenic or aromatic hydrocarbons for the elastomers having unsaturated double bonds, and polar oils based on esters of phthalic acid for the acrylic elastomers.

15. The mixture as claimed in claim 1, wherein the additives are selected from the group consisting of pulverulent inorganic fillers, zinc oxides and titanium oxides, carbon blacks, kaolins, silicas, pigments, coupling agents, antidegradants, processing additives, stearates, and waxes, and represent 10 to 150 phr of the constituent (B).

16. A mixture comprising, per 100 parts by weight:
(A) 10 to 90 parts by weight of the precursors adapted to form at least one graft copolymer having polyamide blocks, said copolymer being composed of a polyolefin backbone and of on average at least 1.3 polyamide grafts on said backbone, and having a nanostructured organization, where
said grafts are attached to the backbone by the residues of an unsaturated monomer (X) having a function capable of reacting with an amino-terminal polyamide; and
the residues of said unsaturated monomer (X) being attached to the backbone by grafting or copolymerization from its double bond,
optionally said constituent (A) comprises at least one ungrafted polyolefin in a proportion such that the nanostructured organization of said component (A) is not lost; and
(B) 90 to 10 parts by weight of a formulation of at least one elastomer which has unsaturated double bonds and is capable of reacting with a crosslinking or vulcanizing agent, said formulation including a system for crosslinking or vulcanizing of said elastomer or elastomers, at least one plasticizer, and other additives,
wherein the precursors comprise a mixture of polyolefinic backbone+amino-terminal polyamide grafts.

17. The mixture as claimed in claim 1, wherein the grafts have a number-average molar mass of less than 5000 g/mol.

18. A crosslinked or vulcanized thermoplastic composition it is formed from the mixture as defined in claim 1, wherein the elastomer of the constituent (B) has been crosslinked or vulcanized in the course of mixing with the constituent (A).

19. A process for preparing the composition as defined in claim 18, comprising the step of milling the formulation of the constituent (B) with the constituent (A) at a sufficient temperature and for a sufficient period of time to crosslink or vulcanize the elastomer of the constituent (B).

20. The process as claimed in claim 19, wherein the milling is carried out at a temperature of between 150 and 240° C. and for a time of between 3 and 15 minutes.

21. A finished article comprising the composition as defined in claim 18 formed by a technique selected from the group consisting of extrusion, coextrusion, extrusion coating, injection molding, compression molding, calendering, deposition on cable, deposition of powders after grinding, electrostatic spraying, fluidized bed dipping, laser prototyping, rotor molding or slush molding, wherein said finished article comprises "skins" for dashboards, door panels or consoles.

* * * * *